UNITED STATES PATENT OFFICE.

ALBERT E. MILLER, OF PORT ARTHUR, TEXAS, ASSIGNOR TO GULF REFINING COMPANY, OF PITTSBURGH, PENNSYLVANIA, A CORPORATION OF TEXAS.

PROCESS OF PURIFYING OIL.

1,311,987.     Specification of Letters Patent.     Patented Aug. 5, 1919.

No Drawing.     Application filed June 26, 1917. Serial No. 177,051.

*To all whom it may concern:*

Be it known that I, ALBERT E. MILLER, a citizen of the United States, residing at Port Arthur, in the county of Jefferson and State of Texas, have invented certain new and useful Improvements in Processes of Purifying Oil, of which the following is a specification.

This invention relates to processes of purifying oil; and it comprises a method of further treating oils and oily materials which have been subjected to the action of aluminum chlorid, wherein the oil, after the action of aluminum chlorid is completed or has been carried as far as may be desired, is allowed to stand in order to settle out aluminum chlorid mechanically as far as possible and is thereafter treated with limited amounts of moist air, to flocculate the suspended or dissolved aluminum chlorid (or its compounds) so that it may be removed by mechanical means; all as more fully hereinafter set forth and as claimed.

Anhydrous aluminum chlorid is a readily reactive chemical which has characteristic converting and purifying effects on hydrocarbon oils. It may be used in many ways. In one process of improving oils, the oil is warmed with aluminum chlorid, at, say, around 150° F., with agitation, for several hours. When lubricating oil, for example, is thus treated various changes occur which are here not important to follow, except to state that the oil is improved in quality. When the oil is improved to the extent desired and is allowed to cool to ordinary temperature, most of the aluminum chlorid compounds settle out as a sludge, while a small percentage remains suspended in the oil in colloidal form. This colloidal matter remaining in the oil must be removed and in practice it is desirable to remove it as soon as the bulk of aluminum chlorid sludge has settled out giving it a deep color and rendering the oil susceptible to deterioration as long as it is present. In another method of improving petroleum oils with aluminum chlorid, crude oil is dried and boiled with aluminum chlorid for a time. The gasolene and kerosene naturally contained in the oil, if any, are usually first removed by distillation; and this distillation may effect the drying. Under the influence of the aluminum chlorid, more or less of the high boiling oils are converted into low boiling oils, such as gasolene, and removed. All the oil may be so converted; but in case it is desired merely to improve the quality of the oil this is not done and the converting action is stopped when the desired amount of oil is converted and the material in the still cooled down. The greater portion of the aluminum chlorid now separates from the residual high boiling oil, but the latter still contains a little colloidal aluminum chlorid or its compounds. Aromatic oils, such as coal tar oils are also often treated with aluminum chlorid. In the prior art this suspended colloidal matter in oils so treated has been removed in a variety of ways. One such way is to subject the oil to the action of a small amount of sulfuric acid,—the sulfuric acid being used solely for the purpose of removing the suspended aluminum chlorid or its compounds and not for the usual purpose of improving the quality of the oil. It is found in practice that agitating the oil with a very small amount of sulfuric acid takes out the aluminum chlorid or its compounds from the oil, flocculating, coagulating and settling it. In another method the oil is filtered through fullers' earth or other pulverulent material with the same result. Often the oil is first treated with a little sulfuric acid and then with fullers' earth.

I have found that the desired result of flocculating these colloidal aluminum chlorid compounds and rendering them removable can be achieved in a simpler and cheaper way, which consists of introducing an extremely small amount of moisture into the treated oil in the form of wet air. The small amount of moisture so introduced reacts with the anhydrous aluminum chlorid and converts the colloidal matter into flocculent matter, which, though still remaining suspended throughout the oil, can now be readily removed by mechanical means, such as filtration or agitating with finely divided fullers' earth or bauxite. Larger amounts of moisture through decomposing the anhydrous aluminum chlorid cause coloring matters to go into solution and do not give flocculent matter removable in this way. And excess of moisture is likely to form hydrochloric acid which will go into solution and into the oil.

In a practical embodiment of the present invention, after the oil has been treated with aluminum chlorid for purifying it and while it still contains a small amount of colloidal aluminum chlorid compounds in suspension, I pass a strong current of moist air or an exceedingly dilute current of steam into the oil. An extremely small quantity of moisture is thus delivered into the oil which clears it and flocculates the colloids. The moist air or steam introduction is then discontinued and as much of the flocculent matter is allowed to settle as possible. I can use atmospheric air in its natural condition or air blown through hot water or steam delivered through a small orifice. The amount of moisture in atmospheric air is, of course, dependent upon climatic conditions, but ordinarily enough moisture is contained therein to accomplish my purpose by blowing same through the oil for a period of from two to three hours. A more rapid method is to blow atmospheric air through hot water before introducing it into the oil, in which case flocculation is accomplished in a few minutes. A still quicker method is to use steam with air, introducing it through a small orifice and agitating the oil with the stream for a few seconds. When the colloidal matter is sufficiently flocculated, agitation with wet air or steam is discontinued and the oil containing the flocculent material is treated further according to its condition. In all cases my object is to use just about enough moisture to produce flocculation but not more. In using moist air, the air itself has some influence since I have noted that dried air also produces flocculation, albeit more slowly.

Various other materials capable of acting on anhydrous aluminum chlorid may be used, as for example ammonia. Air containing a little ammonia gas acts quickly and gives a good separation. Solid sodium carbonate or bicarbonate in small quantities may be agitated with the oil. But the use of moistened air, or of a minute quantity of steam, is the simplest way.

In the case of oils having a viscosity of 100 or below on the Saybolt universal viscosimeter at 100° F., the flocculent bodies will generally settle readily to the bottom of the treating vessel. If complete settling of these bodies does not take place, the small amount remaining in suspension is removed by adding pulverulent inorganic material, such as powdered bauxite or fullers' earth, to the oil and then agitating the mixture with air for a few minutes. On discontinuing the air agitation, the fullers' earth or bauxite settles to the bottom and carries down with it any small traces of flocculent matter which may have remained in the oil. The finished oil can then be decanted from the sediment.

In the case of oils having a viscosity greater than 100° on the Saybolt universal viscosimeter, after flocculating the colloids with wet air or steam, the oils often remain slightly acid, probably with hydrochloric acid. These oils can be made into finished product in several ways, one of which is to mix pulverulent material, such as powdered bauxite or fullers' earth, with the oil and then agitate with air for a few minutes. After agitation, the mixture is filtered through canvas or coarse fullers' earth or bauxite.

A suitable filter for this purpose may be made of heavy canvas or cotton covered with say, a quarter-inch, of fine freshly burned fullers' earth. The object is to use enough fullers' earth or the like to remove the aluminum compound and it is not necessary to use large quantities ordinarily employed for removing color.

It is frequently useful to wash the filtered oil with a weak solution of sodium carbonate (soda ash), following this by washing with water. Sodium carbonate not only removes any free acid which may be present but also breaks up any oil-soluble aluminum soaps which may be present. After the soda and water wash, the oils may be "blown bright" with air.

Instead of using the fullers' earth or the like, the oils after the flocculation in any of the described ways may be simply washed with a little sodium carbonate, and then with water. After settling, the oil may be blown bright with air as before.

It is often advantageous to add a little powdered calcium carbonate to the fullers' earth in order to neutralize any free acid which may be present.

What I claim is:—

1. In the further treatment of oils which have been subjected to the action of aluminum chlorid and which still contain suspended or dissolved aluminum chlorid, the process which comprises air-blowing such an oil until the aluminum chlorid is converted into a form readily settling out.

2. In the further treatment of oils which have been subjected to the action of aluminum chlorid and which still contain suspended or dissolved aluminum chlorid, the process which comprises air-blowing such an oil with moist air until the aluminum chlorid is converted into a form readily settling out.

3. In the further treatment of oils which have been subjected to the action of aluminum chlorid and which still contain suspended or dissolved aluminum chlorid, the process which comprises blowing air through water and then through the oil to be treated.

4. In the further treatment of oils which have been subjected to the action of aluminum chlorid and which still contain suspended or dissolved aluminum chlorid, the process which comprises reacting upon the oil with a reagent adapted to convert anhydrous aluminum chlorid into a flocculated form and treating the oil with fullers' earth containing a little calcium carbonate.

5. In the further treatment of oils which have been subjected to the action of aluminum chlorid and which still contain suspended or dissolved aluminum chlorid, the process which comprises hydrating the anhydrous aluminum chlorid to produce a flocculent readily settling suspension and thereafter treating the oil with an alkaline agent.

6. In the further treatment of oils which have been subjected to the action of aluminum chlorid and which still contain suspended or dissolved aluminum chlorid, the process which comprises hydrating the anhydrous aluminum chlorid to produce a flocculent readily settling suspension and thereafter treating the oil with an alkaline agent and fullers' earth.

In testimony whereof, I affix my signature hereto.

ALBERT E. MILLER.